United States Patent Office 3,644,591
Patented Feb. 22, 1972

3,644,591
SIZING FORMULATIONS FOR POLYMERIC MATERIALS
Harold W. Wolf and Stanley E. Ross, Clifton, N.J., assignors to J. P. Stevens & Co., Inc., New York, N.Y.
No Drawing. Original application Aug. 28, 1967, Ser. No. 663,490, now Patent No. 3,502,743. Divided and this application Oct. 20, 1969, Ser. No. 871,329
Int. Cl. C08f 33/08
U.S. Cl. 260—895
6 Claims

ABSTRACT OF THE DISCLOSURE

This invention relates to heat and humidity resistant sizing formulations for polyolefin yarns, including polypropylene, comprising:
(a) a major amount of a resin component selected from
 (1) hydantoin formaldehyde resin,
 (2) a copolymer of vinyl pyrrolidone and water insoluble comonomer,
 (3) a copolymer of vinyl acetate and water insoluble comonomer, admixed with:
(b) a minor amount of a polyvinyl, containing moiety, e.g. polyvinyl alkyl ether.

---

The present application is a division of application Ser. No. 663,490, filed Aug. 28, 1967, now U.S. Pat. 3,502,743.

This invention relates to sizing formulations useful for protecting yarns derived from thermoplastic materials.

More particularly, this invention concerns sizing formulations useful in protecting polyolefin yarns such as polypropylene during processing.

Sizing materials are customarily applied to most yarns to minimize breakage due to abrasion, friction and related causes which occur during weaving.

A great many sizing formulations are known and a considerable number of formulations are sold commercially. The formulations vary from simple starches and waxes to complex formulations containing several components. For most purposes satisfactory protection can be afforded to glass and polymerically derived yarns using one or more of the known formulations. However, because of their chemical inertness and somewhat unique physical properties, attempts to utilize known sizing formulations for polyolefin yarns such as those derived from polypropylene, polyethylene, and poly(4-methyl-pentene-1) have been unsuccessful. Particularly troublesome are the fine denier, continuous filament yarns as well as spun yarns produced from staple fibers. For example, in many instances the sizes have little initial affinity for polyolefins or once applied are either shed during processing or else accumulate to an excessive degree as a tacky coating. In the latter instance, the tacky material adheres to the metal surfaces encountered during weaving and results in more damage to the treated yarn than normally occurs in processing untreated (control) yarns.

In addition to the minimal requirement of affording prophylactic lubrication to the yarn, a size for polyolefins as illustrated by polypropylene must meet more stringent requirements. They are as follows:

(1) Ease of preparation.—To be useful, the size must lend itself to conventional, simple cooking and handling procedures practiced in size rooms by relatively non-technically trained personnel;

(2) Affinity for polypropylene and compatibility with producer's spin finishes.—Not only must the size have an affinity per se, but the size must be compatible with the diversity of finishes previously applied to the yarn by the producer;

(3) Relative insensitivity toward humidity.—The normal environment of the weaving room is one of high humidity. The size must be resistant to humidity so that it survives the application period and serves its function;

(4) Resistance to heat.—During processing the sized yarn rubs against a variety of metal parts including lease rods, dropwires, heddles and the like. This abrasion generates considerable heat which can degrade the finish and reduce its usefulness. For this reason, good heat stability is another important quality for the sizing formulation;

(5) Compatibility with finishes. — An effective size must be compatible with a vast variety of finishes and industrial coatings, particularly in the case of water insoluble materials;

(6) Ability to form a protective film or coating.—This is especially significant when the size is to be applied to yarns having little or no twist;

(7) Low cost and availability.—Since the purpose of the size is to minimize costs of breakage and it is ultimately removed from the fabric, the cost of the size must be minimal to make its use attractive. Further, the components of the size must be readily available to minimize needless changes in processing operations.

As the above discussion suggests, the development of sizes specifically tailored to polypropylene yarns, especially lighter denier yarns and spun yarns, would represent a useful step forward in the polyolefin art.

Therefore, it is an object of this invention, among others, to set forth novel sizing formulations suitable for polyolefin yarns such as polypropylene.

Another object of this invention is to disclose size formulations especially designed for lighter denier polyolefin yarns derived both from continuous filament and spun yarns.

Yet another more specific object of this invention is to develop low cost polypropylene sizes resistant to the attack of heat and humidity which are compatible with commercially utilized finishes.

Further objects will suggest themselves to those skilled in the art after a perusal of this application.

The above objects are achieved through the application of the sizing formulations whose compositions (in parts by weight) are given below.

FORMULATION 1

80–100 parts by weight of a hydantoin formaldehyde resin admixed with 0–10 parts by weight of a polyvinyl containing moiety; 1–20 parts by weight of a copolymer derived from vinylpyrrolidone and water insoluble comonomers, and 0–5 parts by weight of sizing adjuvants.

FORMULATION 2

65–100 parts by weight of a copolymer derived from the group consisting of vinylpyrrolidone and vinyl acetate, and water insoluble comonomers; 0–35 parts by weight of a polyvinyl containing moiety, and 0–5 parts by weight of sizing adjuvants.

FORMULATION 3

80–100 parts by weight of a hydantoin formaldehyde resin, admixed with 3–20 parts by weight of a polyvinyl containing moiety.

The above formulations are expressed in the form of their concentrated solutions and should be diluted with appropriate diluents to a convenient solids level for utilization as sizing. Ordinarily, the dilution is made to about the 5 to 15% solids level, preferably using water or admixtures of water and any other suitable diluent. The latter includes the lower alkanols such as ethanol and the propanols as well as any other inert diluent.

The sizing formulations may also contain a small quantity of suitable sizing adjuvants such as wetting agents, detergents, surfactants, thickening agents, softening agents, stabilizing agents and the like. The adjuvants are normally used in small amounts, most usually constituting from about 0.1 to 5% by weight of the formulation.

Illustrative adjuvants include wetting agents such as alkyl polyethylene glycol ethers and alkyl aryl polyethylenes and their salts, including tridecyl polyethylene glycol ether, dodecyl phenyl polyethylene glycol ether, nonyl phenyl polyethylene glycol ether, trimethyl nonyl polyethylene glycol ether, the sodium sulfate derivatives of 2-ethyl-1-hexanol, the sodium sulfate derivative of 7-ethyl-2-methyl, 4-undecanol, dioctyl sodium sulfosuccinate, nonyl-phenyl-polyethoxy ethanol, octyl-phenyl-polyethoxy ethanol, isooctyl-phenyl-polyethoxy ethanol, t-isooctyl phenyl(polyoxymethylene) ethanol, t - isooctylphenoxy-hexadecakis(ethylenoxy) ethanol, stearyl dimethyl benzyl ammonium chloride, plasticizers such as triacetin and the like.

As indicated above, the use of the various adjuvants is not critical to the success of the sizing formulations and for this reason no attempt is made herein to compile a lengthy list of utilizable materials. However, a satisfactory, but not exhaustive list of these adjuvants appears among other places in "Soap and Chemical Specialties," vol. 31, No. 7, page 61; No. 8, pages 48–61; No. 9, pages 52–67 and No. 10, pages 38–67 (1955), as well as the more recent editions and revisions of these listings.

The sizing formulations of this invention may be applied to polypropylene yarns using a variety of procedures and equipment well known in the textile art. One suitable procedure among many others comprises passing a plurality of polypropylene yarn ends from a creel to a beam through a size box which contains the sizing formulation so that the sizing composition is deposited therein.

The temperature of the size bath is not critical and can range rather broadly between about 70° F. and 200° F., more preferably between about 130–150° F. The residence time in the bath is not important as long as at least the desired amount or more of size is applied. A convenient means of assuring this is by regulating the speed of the yarn fed into the size box and/or by adjusting the concentration of the size. For the instant invention a rate of feed ranging between 10–25 yards a minute has been found to be satisfactory when the size concentration varies between the aforementioned 5–15% solids level.

After application of the size to the yarn, excess size is removed from the treated yarn by passing the yarn between one or more sets of squeeze rolls set to retain the desired degree of pickup. Ordinarily, the pressure of the rolls is adjusted to obtain a pickup of between 50–100% based on the weight of the untreated yarn.

After this, the treated yarn is substantially dried using conventional drying devices such as drying cans or cylinders, hot air, infrared or the like. Usually, the drying step, whatever the means employed is carried out between about 150–230° F. for a sufficient time to leave about 2 to 15% moisture in the sized yarn.

To more clearly indicate the scope of this invention, insofar as the components of the size formulation are concerned, the following glossary is submitted:

(a) Hydantoin formaldehyde resins.—These are resins that are illustrated by the resins selected from the group consisting of dialkyl hydantoin formaldehyde adducts such as dimethyl-, diethyl-, and dibutyl hydantoin formaldehyde resins and methylol dialkyl hydantoins such as monomethylol dimethyl hydantoin, monomethylol diethyl hydantoin as well as the closely related dimethylol adducts; the preferred resins are the dimethyl hydantoin resins, (b) Composition containing a polyvinyl moiety.— These compositions comprise polyvinyl alkyl ethers such as the preferred polyvinyl methyl ether, polyvinyl ethyl ether, the polyvinyl butyl ethers and the like, and (c) Copolymer derived from the group consisting of vinyl pyrrolidone and vinyl acetate, and water insoluble comonomers.—These copolymers result from the combination of varying ratios of vinyl pyrrolidone (from about 20 to about 80 parts by weight of vinyl pyrrolidone) and a water insoluble monomer (from about 20 to about 80 parts by weight of monomer) such as 2-ethyl hexylacrylate, ethyl acrylate, styrene, vinyl acetate, dibutyl maleate and mixtures thereof. The preferred copolymers are those comprising from about 60–80 parts by weight of vinyl pyrrolidone and from about 40–20 parts by weight of a monomer selected from the group of ethyl acrylate, 2-ethyl hexylacrylate and vinyl acetate.

To best illustrate this invention in its preferred embodiments, the following examples are submitted:

EXAMPLE 1

A polypropylene warp consisting of 6320 ends of black 165 denier, 20 filament, 3 turns per inch "Z" yarn is treated with a cncentrated size formulation comprising 93 parts by weight of dimethyl hydantoin formaldehyde resin (124 parts by weight of a 75% by weight solution of the resin in water), 7 parts by weight of polyvinyl methyl ether (14 parts by weight of a 50% by weight solution of the ether in water) and 0.05 part by weight of a commercially obtained wetting agent (trimethyl nonyl polyethylene glycol ether). The concentrated solution is diluted with 12 times its volume of water and is applied from size boxes at room temperature with the warp running at a speed of 20 yds./min. through a Cocker slasher. The warp is dried with the cylinders at the following temperatures:

| Cylinder No.: | Temp., ° F. |
|---|---|
| 1 | 190 |
| 2 | 195 |
| 3 | 200 |
| 4 | 190 |
| 5 | 180 |
| 6 | 170 |
| 7 | Room temp. |

The above size adheres better to the warp yarn than any previously evaluated commercially available size for polypropylene and exhibits better performance on the loom.

EXAMPLE 2

A polypropylene warp (Herculon black polypropylene 165 denier, 20 filament, 3 turns per inch "Z" yarn) is treated in a Cocker slasher with a concentrated sizing formulation comprising 98 parts by weight dimethyl hydantoin formaldeheyde resin (131 parts by weight of a 75% by weight solution of the resin in water), 2 parts by weight of a copolymer of vinyl pyrrolidone and vinyl acetate (made up from 5 parts by weight of a 40% by weight water solution of copolymer) copolymer comprising a weight ratio of 70 parts by weight of vinyl pyrolidone to 30 parts by weight of vinyl acetate and 0.2 part by weight of triacetin plasticizer and 0.02 part by weight of a wetting agent (dioctyl sodium sulfosuccinate), diluted with 11 times its volume (to about the 9% solids level) of water. The size box temperature in this run is 140° F. and the drying cylinders are as follows:

| Cylinder No.: | Temp., ° F. |
|---|---|
| 1 | 190 |
| 2 | 195 |
| 3 | 200 |
| 4 | 190 |
| 5 | 180 |
| 6 | 170 |
| 7 | Room temp. |

The warp speed through the slasher is 18 yd./min. No deposits are present on rolls, cans or lease rods.

Laboratory evaluation of the force required to bind the yarns together[1] (i.e., 2 ply, 165 denier, 3 turns per inch), tested on the Instron at 0.5″/min. crosshead speed is as follows:

10% size (solids content)—binding force 5.8 grams
15% size (solids content)—binding force 7.9 grams

EXAMPLE 3

Polypropylene yarn (165 denier, 2 ply, 3 turns per inch) is treated with a concentrated sizing formulation comprising 95 parts by weight of dimethyl hydantoin formaldehyde (127 parts by weight of a 75% by weight solution of the resin in water) and 5 parts by weight of polyvinyl methyl ether (10 parts by weight of a 50% by weight solution of the ether in water), diluted to eleven times its volume in water, the solids level being about 9%. The conditioned yarn is then tested on the Instron Tensile Tester to obtain the binding force required to separate the plies of the sized 2 ply yarn. With the cross-head speed of 0.5″/min. the force is as follows:

| | Percent concentration of size on yarn | Binding force, grams |
|---|---|---|
| Sample: | | |
| A (DMHF/PVME) | 9 | 4.4 |
| B (DMHF/PVME) | 14 | 5.1 |
| Control (no size) | 0 | 0.5–1.0 |
| Polyvinyl alcohol, 1 (Elvanol 51-05) | 9 | 2.8 |
| Polyvinyl alcohol, 2 | 14 | 2.8 |

In related embodiments two concentrated sizing formulations are prepared identical to the one above except that in one formulation monomethylol dimethyl hydantoin is substituted on a weight by weight basis for dimethyl hydantoin formaldehyde resin, while in the second formulation dimethylol hydantoin formaldehyde is substituted on a weight by weight basis for the dimethyl hydantoin formaldehyde resin. In both instances the concentrated formulations are diluted with 10 times their volume of water (10% solids level) per application. Results comparable to those above are obtained.

EXAMPLE 4

A 165 denier, 20 filament, 3 turns per inch "Z" polypropylene black yarn consisting of 4712 ends is treated with a concentrated sizing formulation comprising 85 parts by weight of dimethyl hydantoin formaldehyde resin (113 parts by weight of a 75% by weight solution of the resin in water), 15 parts by weight of a copolymer of vinyl pyrrolidone and 2-ethyl hexylacrylate (made up from 37.5 parts by weight of a 40% water solution of copolymer), comprising a weight ratio of 80 parts by weight of vinyl pyrrolidone to 20 parts by weight of 2-ethyl hexylacrylate, diluted to 10 times its volume (10% solids content) with water. Application is made at 140° F. at a speed of 18 yds./min. using a Cocker slasher. The warp is run with a slight tension that produced approximately 2.5% stretch. No deposit or foaming is noted during slashing. Warps feel smooth and flexible.

Using the same yarn procedure, temperatures and dilutions described above, two samples of yarn are treated with diluted sizing formulation. In one instance 15 parts by weight of a copolymer of vinyl pyrrolidone and styrene (60 parts by weight of vinyl pyrrolidone to 40 parts by weight of styrene) is substituted for the vinyl pyrrolidone-2-ethyl hexylacrylate copolymer while in the second instance 15 parts by weight of a copolymer comprising 50 parts by weight of vinyl pyrrolidone and 50 parts by weight of ethyl acrylate is substituted for the copolymer of Example 4. In both instances smooth, flexible warps are obtained.

EXAMPLE 5

A warp of 50 ends of 165 denier 34 filament 0.5TZ natural polypropylene yarn is sized with a size solution comprising an admixture of 70 parts by weight of a copolymer of vinyl pyrrolidone and vinyl acetate (175 parts by weight of a 40% by weight solution of an aqueous solution of the copolymer), the copolymer comprising a weight ratio of 70 parts by weight of vinyl pyrrolidone to 30 parts by weight of vinyl acetate, and 30 parts by weight of polyvinyl methyl ether (60 parts by weight of a 50% by weight solution of the ether in water) diluted with about 19 times its volume with water to give a total solids concentration of 5%. Approximately 0.05 part by weight of trimethyl nonyl polyethylene glycol ether is added to the mixture.

The size is applied using a Callaway Model 50 slasher, maintaining the solution of size in the box at room temperature and slashing the warp at 20 yds./min. Approximately 100 yds. of warp is slashed. The sized yarn has the following tensile properties compared to the control (unsized yarn).

| | Denier | Breaking strength (gms.) | Tenacity, g./d. | Elongation, percent |
|---|---|---|---|---|
| Sized | 179 | 772 | 4.32 | 44.1 |
| Control (unsized) | 168 | 743 | 4.43 | 41.2 |

The sized yarn is woven at speed of 170 picks per min. using a construction of 45 picks/inch along with another warp section which had been sized with a commercially available size for nylon (polyacrylic acid). Analysis of the sized yarns gives the following size contents:

Percent size content
Inventive sizing formulation _____ 7
As received and sized with polyacrylic acid _____ 1.7

The yarn sized with the inventive formulation clearly weaves better than that sized with a commercially available size in that there is no yarn breakage, no evidence of fuzzing, and very little opening between fils when inspected under a pick-glass. This experiment also demonstrates that a typical commercially available size suitable for other thermoplastics such as polyamides is unsuitable for polypropylene.

EXAMPLE 6

A sizing solution comprising 97 parts by weight of dimethyl hydantoin formaldehyde resin (129 parts by weight of a 75% by weight aqueous solution) and 3 parts by weight of a copolymer of vinyl acetate and dibutyl maleate (6 parts by weight of a 50% by weight aqueous solution) is cast as a film on a polyethylene substrate to determine the adhesion of the size to the substrate. This evaluation is carried out in accordance with ASTM Method D903–49, entitled "Peel or Stripping Strength of Adhesives." The film is smooth and non-tacky and exhibits a peel value of 1000 grams/inch.

Another sizing solution comprising 82 parts by weight of dimethyl hydantoin formaldehyde resin (109 parts by weight of a 75% by weight aqueous solution) and 18 parts by weight of a copolymer of vinyl pyrrolidone and ethyl acrylate (36 parts by weight of a 50% by weight aqueous solution of the copolymer) is cast as a film on a polypropylene substrate. The peel value is 960 grams/inch.

In contrast, a commercially available polyacrylic acid size exhibits a peel value from a polypropylene substrate of 137 grams/inch.

EXAMPLE 7

Two 165 denier/34 filament yarns are plied with 3 turns per inch and treated with a 1 to 10 volume aqueous dilution of a concentrated sizing formulation comprising

---

[1] The force required to separate the plies is termed the "binding force" and is indicative of the adhesion of the sizing formulation to the yarn. The binding force is determined on the conditioned sample (65% relative humidity, 70° F.) on the Instron Tensile Tester (Instron Corporation, Canton, Mass.), by placing the ends into the upper jaw of the machine and having a separating pin fastened to the lower jaw. The yarns are then separated over a length of 5 inches by operating the cross-head at a speed of 0.5″/min. and averaging 10 peaks on the chart to obtain the average binding force.

97 parts by weight of a copolymer of vinyl pyrrolidone and vinyl acetate (made up from 242 parts by weight of a 40% by weight of an aqueous solution of the copolymer) comprising a weight ratio of 70 parts by weight of vinyl pyrrolidone to 30 parts by weight of vinyl acetate, 3 parts by weight of triacetin [$(CH_3COOH)_3C_3H_5$] and 0.2 part by weight of trimethyl nonyl polyethylene glycol ether. The application of size is made at room temperature. The procedure for determining binding force necessary to separate the plies using the Instron tester is described in the earlier examples. The binding force in this instance is measured and determined at 13.4 grams compared to unsized yarn value at 0.5 gram. A casting of this same combination on a polypropylene substrate is allowed to dry and conditioned at 65% R.H. and 70° F. and gives a peel value of 635 grams/inch when peeled at the rate of 0.5 inch/min. on the Instron tester. The conditioned material has a smooth, tack-free surface.

As the foregoing examples indicate, numerous changes and modifications can be made in the components of the inventive size formulations without departing from the inventive concept. The metes and bounds of this invention are best indicated by the claims which follow.

What is claimed is:
1. A sizing formulation for polyolefins comprising
   (a) a major amount of a copolymer which is a copolymer of vinyl pyrrolidone with a comonomer selected from the group consisting of 2-ethyl hexylacrylate, ethyl acrylate, styrene, vinyl acetate, dibutyl maleate and mxtures of,
   (b) a minor amount of a polyvinyl alkyl ether.

2. A sizing formulation as claimed in claim 1 wherein said copolymer is a copolymer of vinyl pyrrolidone and vinyl acetate.

3. A sizing formulation as claimed in claim 1 wherein said polyvinyl alkyl ether is selected from the group consisting of polyvinyl methyl ether, polyvinyl ethyl ether and polyvinyl butyl ether.

4. A sizing formulation as claimed in claim 1 comprising at least 65 parts by weight of said copolymer per each 100 parts by weight of solids.

5. A sizing composition as claimed in claim 1 wherein said polyvinyl alkyl ether is polyvinyl methyl ether.

6. The formulation of claim 1 wherein the formulation comprises
   (a) about 70 parts by weight of copolymer derived from vinyl pyrrolidone and vinyl acetate, admixed with
   (b) about 30 parts by weight of polyvinyl methyl ether.

References Cited
UNITED STATES PATENTS

| | | | |
|---|---|---|---|
| 3,505,429 | 4/1970 | Press | 260—857 |
| 2,941,980 | 6/1960 | Robinson | 260—45.95 |

MURRAY TILLMAN, Primary Examiner

C. J. SECCURO, Assistant Examiner

U.S. Cl. X.R.

117—138.8 E; 260—29.4 UA, 29.6 B, 30.8 R, 31.6, 33.2 R, 33.4 R, 33.4 P, 32.4, 851, 874, 901

UNITED STATES PATENT OFFICE
CERTIFICATE OF CORRECTION

Patent No. 3,644,591          Dated February 22, 1972

Inventor(s) Harold W. Wolf and Stanley E. Ross

It is certified that error appears in the above-identified patent and that said Letters Patent are hereby corrected as shown below:

Column 4, line 19, "cncentrated" should read --concentrated --;

Column 7, line 30, Claim 1, "mxtures of" should read -- mixtures thereof, and -- .

Signed and sealed this 14th day of May 1974.

(SEAL)
Attest:

EDWARD M. FLETCHER, JR.
Attesting Officer

C. MARSHALL DANN
Commissioner of Patents